United States Patent
Kim et al.

(10) Patent No.: US 12,470,432 B1
(45) Date of Patent: Nov. 11, 2025

(54) EXPEDITED TRAINING FOR FAST LINKUP

(71) Applicant: Credo Technology Group Limited, George Town (KY)

(72) Inventors: Kyungjin Kim, San Jose, CA (US); Wenzhe Gao, Cupertino, CA (US); Shunken Huang, Hsinchu (TW); Yongyuan Zhang, Milpitas, CA (US); Yu Fen Lin, San Francisco, CA (US)

(73) Assignee: Credo Technology Group Limited, Grand Cayman (KY)

( * ) Notice: Subject to any disclaimer, the term of this patent is extended or adjusted under 35 U.S.C. 154(b) by 12 days.

(21) Appl. No.: 18/785,544

(22) Filed: Jul. 26, 2024

(51) Int. Cl.
*H04L 25/02* (2006.01)
*H04L 25/03* (2006.01)

(52) U.S. Cl.
CPC .... *H04L 25/0222* (2013.01); *H04L 25/03006* (2013.01); *H04L 25/03859* (2013.01); *H04L 2025/03503* (2013.01)

(58) Field of Classification Search
CPC ........... H04L 25/0222; H04L 25/03006; H04L 25/03859
USPC ........................................................ 375/262
See application file for complete search history.

(56) References Cited

U.S. PATENT DOCUMENTS

| | | | |
|---|---|---|---|
| 7,058,150 B2 | 6/2006 | Buchwald et al. | |
| 8,639,112 B2 | 1/2014 | Lindsay | |
| 9,461,851 B1* | 10/2016 | Liao | H04L 25/03885 |
| 10,892,763 B1 | 1/2021 | Hidaka et al. | |
| 11,018,656 B1 | 5/2021 | Sun | |
| 11,228,468 B2 | 1/2022 | Hidaka et al. | |
| 2005/0185743 A1* | 8/2005 | Li | H04L 7/042 375/350 |
| 2016/0352557 A1* | 12/2016 | Liao | H04L 25/03885 |

\* cited by examiner

*Primary Examiner* — Leila Malek
(74) *Attorney, Agent, or Firm* — RAMEY LLP; Daniel J. Krueger

(57) ABSTRACT

To expedite training and achieve fast linkup times, one illustrative receiver includes: a continuous time linear equalizer configured to provide a controllable amount of high frequency boost to an analog receive signal; an analog to digital converter configured to convert the analog receive signal into a digitized receive signal; a channel estimation module configured to obtain a spectral density measurement of the digitized receive signal at each of two different frequencies, the spectral density measurements having a difference indicating a slope of a channel response; and a microcontroller configured to set at least one operating parameter of the continuous time linear equalizer based on said difference. An illustrative method includes: estimating a slope of frequency dependence of a channel response; using the slope to retrieve a set of equalization parameters from a look-up table; and employing the set of equalization parameters to exit a receiver training mode.

17 Claims, 4 Drawing Sheets

Fig. 3

| R | dB | MIN | MAX | ATN | EI | ICS | CCS | ICO | RFC | CM1 | CP1 | F0 | F1 |
|---|---|---|---|---|---|---|---|---|---|---|---|---|---|
| 0 | 3 | - | 0.054 | 4 | 0 | 9 | 0 | 0 | 15 | 0 | -10 | 32 | 1 |
| 1 | 7.1 | 0.054 | 0.088 | 4 | 0 | 9 | 0 | 0 | 15 | 0 | -10 | 32 | 1 |
| 2 | 10 | 0.088 | 0.181 | 4 | 0 | 9 | 0 | 0 | 15 | 0 | -10 | 30 | 1 |
| 3 | 11.9 | 0.181 | 0.219 | 4 | 0 | 9 | 1 | 0 | 14 | 0 | -10 | 29 | 1 |
| 4 | 13.6 | 0.219 | 0.255 | 4 | 0 | 7 | 2 | 8 | 13 | 0 | -10 | 29 | 1 |
| 5 | 15.3 | 0.255 | 0.291 | 4 | 0 | 6 | 3 | 8 | 13 | -5 | -20 | 29 | 1 |
| 6 | 16.7 | 0.291 | 0.325 | 4 | 0 | 6 | 4 | 8 | 13 | -5 | -20 | 29 | 1 |
| 7 | 17.9 | 0.325 | 0.348 | 3 | 1 | 6 | 5 | 8 | 13 | -5 | -20 | 29 | 1 |
| 8 | 19.5 | 0.348 | 0.385 | 3 | 1 | 6 | 6 | 8 | 12 | -5 | -30 | 29 | 1 |
| 9 | 23.2 | 0.385 | 0.432 | 3 | 1 | 7 | 7 | 8 | 10 | -10 | -30 | 28 | 1 |
| 10 | 26.6 | 0.432 | 0.501 | 3 | 1 | 8 | 8 | 8 | 9 | -10 | -30 | 27 | 1 |
| 11 | 29.2 | 0.501 | 0.558 | 3 | 1 | 8 | 9 | 8 | 8 | -10 | -30 | 26 | 3 |
| 12 | 30.8 | 0.558 | 0.592 | 3 | 1 | 8 | 10 | 8 | 8 | -10 | -30 | 25 | 4 |
| 13 | 32.9 | 0.592 | 0.630 | 3 | 1 | 9 | 11 | 8 | 7 | -10 | -40 | 24 | 5 |
| 14 | 35.1 | 0.630 | 0.674 | 2 | 1 | 9 | 12 | 8 | 7 | -20 | -35 | 23 | 6 |
| 15 | 37.4 | 0.674 | 0.700 | 1 | 1 | 10 | 13 | 8 | 7 | -30 | -35 | 22 | 7 |
| 16 | 40.2 | 0.700 | 0.725 | 0 | 1 | 10 | 13 | 8 | 7 | -40 | -30 | 21 | 8 |
| 17 | 41.7 | 0.725 | 0.780 | 0 | 1 | 11 | 13 | 8 | 6 | -50 | -40 | 21 | 10 |
| 18 | 43.2 | 0.780 | - | 0 | 1 | 11 | 13 | 8 | 5 | -50 | -40 | 20 | 10 |

…

EXPEDITED TRAINING FOR FAST LINKUP

TECHNICAL FIELD

The present disclosure generally relates to digital communications receivers, and more particularly to methods and receivers providing expedited training using channel-measurement based lookup tables of optimized equalization parameters.

BACKGROUND

The Peripheral Component Interconnect Express ("PCIe") Specification is one of a variety of standards for general purpose input/output interconnects. Such interconnects are frequently used for expansion buses that can accept expansion cards or other interchangeable components for augmenting the resources and capabilities of computers and other electronic systems. The PCI Special Interest Group is an industry consortium that regularly updates the PCIe Specification every few years to double the data rate while maintaining backward compatibility. The PCIe Gen6 Specification supports $32 \times 10^9$ PAM4 symbols per second per lane, for a net raw symbol rate of 512 GT/s (giga transfers per second) in each direction over a 16-lane configuration. Such data rates make PCIe attractive for systems designed to implement machine learning, artificial intelligence, real time image processing, gaming, high bandwidth data storage, and even computer center networking.

With its origins as a parallel bus, PCIe imposes strict limitations on latency to facilitate the use of a load-store interconnect protocol. This latency limitation necessarily limits the reach of a given PCIe link particularly at high symbol rates where noise or other signal integrity issues may necessitate relatively frequent retransmissions. Retimers may combat such signal integrity issues and (despite increasing the minimum latency) may improve consistency and substantially reduce the average transaction latency.

An important performance characteristic of computer buses and communication links in general is the linkup time, i.e., the time required for the link to enter normal operations after being booted up or reset. As one example, the PCI Express CARD Electromechanical Specification sets a limit of 200 ms from power-on to the link active (L0) state, and it is expected that up to 120 ms of this may be expended on other operations that are preliminary to link training operations. Certain existing training methods employ a step-by-step, parameter-by-parameter, optimization process that can require 10 s or more for equalizer training. An expedited training method would be desirable.

SUMMARY

Accordingly, there are disclosed herein methods and receivers that expedite training to provide fast linkup times. One illustrative receiver includes: a continuous time linear equalizer configured to provide a controllable amount of high frequency boost to an analog receive signal; an analog to digital converter configured to convert the analog receive signal into a digitized receive signal; a channel estimation module configured to obtain a spectral density measurement of the digitized receive signal at each of two different frequencies, the spectral density measurements having a difference indicating a slope of a channel response; and a microcontroller configured to set at least one operating parameter of the continuous time linear equalizer based on said difference.

An illustrative method includes: using a continuous time linear equalizer to provide a controllable amount of high frequency boost to an analog receive signal; using an analog to digital converter to convert the analog receive signal into a digitized receive signal; obtaining a spectral density measurement of the digitized receive signal at each of two different frequencies, the spectral density measurements having a difference indicative of a slope of a channel response; and setting at least one operating parameter of the continuous time linear equalizer based on said difference.

Another illustrative method includes: estimating a slope of frequency dependence of a channel response; using the slope to retrieve a set of equalization parameters from a look-up table; and employing the set of equalization parameters to exit a receiver training mode.

Each of the foregoing may be implemented individually or conjointly, together with any one or more of the following features in any suitable combination: 1. a digital filter configured to reduce intersymbol interference of the digitized receive signal. 2. the microcontroller is configured to set at least one coefficient of the digital filter based on said difference. 3. a decision feedback equalizer having a feedback filter or a precomputation unit configured to compensate for trailing intersymbol interference of the digitized receive signal. 4. the microcontroller is configured to set at least one operating parameter of the feedback filter or precomputation unit based on said difference. 5. the microcontroller is configured to set at least eight operating parameters based on said difference. 6. a variable gain amplifier configured to adjust an amplitude of the analog receive signal, wherein the microcontroller is configured to set a gain of the variable gain amplifier based on said difference. 8. the microcontroller is configured to set a reference voltage of the analog to digital converter based on said difference. 9. a level finder configured to produce a receiver performance measure. 10. the microcontroller is configured to use the receiver performance measure to optimize at least one operating parameter after setting that at least one operating parameter based on said difference. 11. using said difference to retrieve a set of optimized operating parameters from a look-up table, the set of optimized operating parameters enabling a receiver to enter normal operating mode without further training. 12. measuring receiver performance based on at least one of equalization error, eye opening, and signal to noise ratio; and using the receiver performance to optimize at least one operating parameter after setting that at least one operating parameter based on said difference. 13. estimating a slope includes: measuring a spectral density of a receive signal at two different frequencies; and determining a difference between the spectral densities at the two different frequencies.

BRIEF DESCRIPTION OF THE DRAWINGS

FIG. 3 is an illustrative lookup table of equalization parameters.

DETAILED DESCRIPTION

Figure 1:
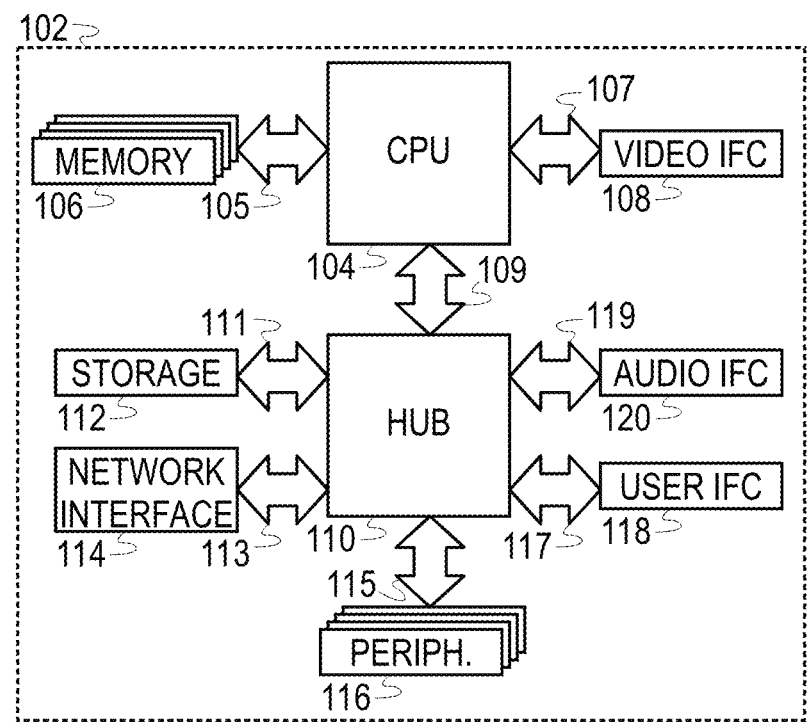
FIG. 1 shows an illustrative computer.

Note that the specific embodiments given in the drawings and following description do not limit the disclosure. On the contrary, they provide the foundation for one of ordinary skill to discern the alternative forms, equivalents, and modifications that are encompassed in the claim scope.

The disclosed receivers and methods are best understood in an illustrative context. Accordingly, FIG. 1 shows an illustrative computer system 102 having a central processing unit 104 coupled via a memory bus 105 to system memory 106, coupled via a video bus 107 to a video display interface 108, and coupled via an interface bus 109 to a platform hub 110. The platform hub 110 supports a storage bus 111 to read and write from a nonvolatile information storage device 112, a network interface bus 113 to communicate via a wired and/or wireless network interface 114, an expansion bus 115 to support connection with one or more peripherals 116, an input/output bus 117 to support user interface devices 118 such as touch screens, keyboards, mice, etc., and an audio bus 119 to support an audio interface 120.

System memory 106, local information storage device 112, and/or a remote information storage device accessible via network interface 114, provides software to the central processing unit 104, configuring the computer system 102 to interact with users and/or to implement a desired function. As one example, computer system 102 may act as a high bandwidth network accessible storage device. As another example, computer system 102 may interact with other computer systems as part of a computer cluster that implements machine learning, artificial intelligence, real time image processing, gaming, numerical simulation, or another type of highly parallel processing task.

The buses support high bandwidth communications between the central processing unit 104 and the other computer components to enable the processing unit to carry out the desired operations. At least some of the buses 105, 107, 109, 111, 113, 115, 117, 119, may be PCIe standard compliant. One or more of the buses may include a PCIe repeater to maintain link performance at a greater range or across a lossy connection such as a connector port or insertion connector for removeable cards. The PCIe buses employ electrical conductors, e.g., printed circuit board traces, to convey high bandwidth digital communications signals from a transmitter to a receiver. Separate conductors are used for the upstream and downstream data streams to support full duplex communication over each lane.

Figure 2:
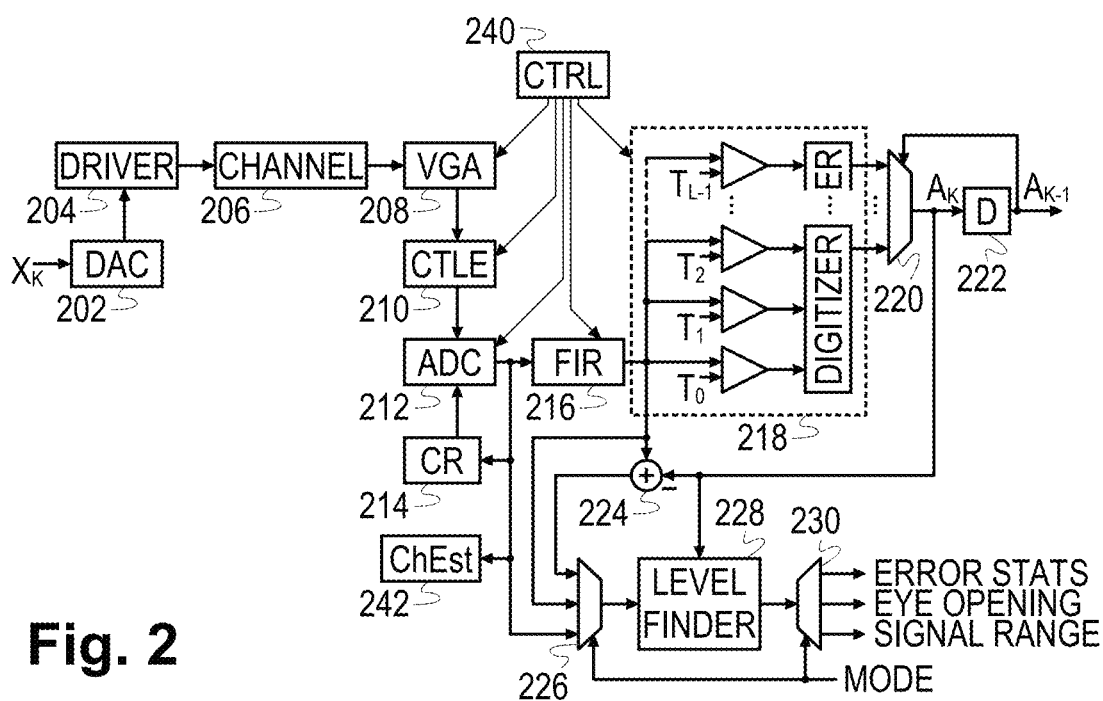
FIG. 2 is a block diagram of an illustrative digital communications channel.

FIG. 2 shows an illustrative transmitter and receiver for one side of a lane in a PCIe link. A typical link includes multiple lanes and FIG. 2 represents the arrangement that may be provided for each side of each lane. The transmitter includes a digital to analog converter (DAC) 202 and a driver 204. The digital transmit signal $x_k$ represents a (optionally pre-equalized) sequence of channel symbols for conveying the desired data stream. The DAC 202 converts the digital transmit signal $x_k$ into an analog transmit signal, which is buffered and optionally amplified by driver 204 before being coupled to the conductor(s) represented by channel 206.

As the transmit signal is conveyed along the channel 206, the signal experiences attenuation, dispersion, and background interference, typically necessitating equalization by the receiver (elements 208-222) to assure that the data stream is received correctly. The typical channel response for printed circuit board traces (and transmission lines) shows an approximately linear dependence for gain (in dB) as a function of frequency. The slope is negative such that higher frequencies have a higher attenuation.

The receiver may include a variable gain amplifier (VGA) 208 to provide gain as needed to control the amplitude of the analog receive signal. A continuous time linear equalizer (CTLE) 210 may provide a controllable amount of boost for the high frequency components of the receive signal relative to the low frequency components. An analog to digital converter (ADC) 212 samples and digitizes the analog receive signal in accordance with a sampling clock from clock recovery module 214. The clock recovery module 214 may derive the sampling clock from the digitized receive signal and/or from an equalization error signal using any suitable timing recovery technique, many of which are available in the open literature. Notable examples can be found in, e.g., U.S. Pat. No. 7,058,150 "High-Speed Serial Data Transceiver and Related Methods"; and U.S. Pat. No. 10,892,763 "Second-order Clock Recovery Using Three Feedback Paths", both of which are incorporated herein by reference.

A finite impulse response (FIR) filter or other digital filter 216 operates on the digitized receive signal to provide a filtered signal having reduced leading intersymbol interference. A decision feedback equalizer compensates for trailing intersymbol interference as it recovers transmitted channel symbols from the filtered signal. The DFE may use a feedback filter, or it may be "unrolled" to form a precomputation unit 218 having a set of comparators to compare the filtered receive signal to various decision thresholds that account for trailing intersymbol interference from potential pre-cursor channel symbols. The comparator outputs may be taken directly as tentative symbol decisions or digitizers may be used to convert the comparator outputs into binary representations of tentative symbol decisions. A multiplexer 220 selects one of the tentative symbol decisions as the current symbol decision based on a previous symbol decision stored in register 222. The register 222 stores the current symbol decision to be used to obtain a subsequent symbol decision.

A subtraction element 224 subtracts the symbol decision value from the filtered signal value to obtain an equalization error. Based on a mode control signal, a multiplexer 226 selects one of: the equalization error, the filtered signal value, and the digitized receive signal value, to be provided to a level finder 228 of previous symbol decisions. The level finder 228 operates over a predetermined number of symbol intervals to collect error statistics, measure an eye opening, or determine a signal range. These measurements can be conditioned on the symbol decisions to, e.g., provide separate measurements for each eye opening. An output demultiplexer 230 may route the measurements to different storage registers based on the mode control signal. More detail regarding the operation of the receiver and level finder can be found in, e.g., U.S. Pat. No. 11,018,656, "Multi-function level finder for SerDes" by Junqing Sun, which is hereby incorporated herein by reference. The level finder measurements can be used to provide measurements of receiver performance, e.g., eye opening height, equalization error, or (if the equalization error is used as a noise measure) signal to noise ratio.

The illustrative receiver may be configured and controlled by a microcontroller 240, including initialization after power-on or reset. When the receiver is powered-on, the microcontroller 240 sets the values of the operating parameters for the various components to initial default values designed to enable operation of a channel estimation (ChEst) module 242. In some embodiments, the ChEst module 242 is implemented as firmware executed by the microcontroller 240. The ChEst module 242 filters the digitized receive signal during transmission of a training pattern to measure the digitized receive signal's power spectral density (PSD) or energy spectral density at two different frequencies, e.g., ¾ and ¼ of the Nyquist frequency. (The Nyquist frequency is half of the channel symbol rate. For PCIe Gen6, the Nyquist frequency is 16 GHZ.) The measurement accuracy can be improved by averaging multiple such measurements. Assuming the training pattern has a relatively flat power spectrum, the slope of the channel response can be determined by subtracting the higher frequency measurement from the lower frequency measurement. If the spectrum of the training pattern is not flat, the calculation may be adjusted to account for the training pattern's PSD difference at the chosen frequencies.

As described further below, the microcontroller 240 employs the ChEst module 242 to determine a spectral density difference indicating the slope of the channel response, then uses that difference to select the operating parameters for the various receiver components. The microcontroller 240 optionally performs iterative optimization of a minimal number of key parameters before exiting the training mode for the normal operations mode. Further optimization of the operating parameters may be conducted in the background during normal operations. Where the number of operating parameters is six, eight, ten, or more, this approach substantially reduces training time requirements, shortening the receiver's transition to normal operating mode after a restart or reset.

In at least some contemplated embodiments, the microcontroller 240 employs a look-up table (LUT) to set the operating parameters for the various receiver components based on the ChEst measurements. FIG. 3 shows an illustrative LUT 302 including 10 operating parameters, though in practice the number of operating parameters depends on the receiver implementation and may be significantly higher. The illustrated values and even the illustrated parameters provided here are merely illustrative, as the actual values and parameters will be implementation dependent. Nevertheless, the illustrated trends may be helpful for the reader's understanding.

The first three columns are shown for reference but need not be part of the LUT itself. The first column shows the row number R ranging in this example from zero to 18. The second column shows insertion loss in dB. Insertion loss is a measure of channel attenuation used in modeling the channel and determining optimized parameter values. The third and fourth columns show a minimum and a maximum ChEst measurement, indicating the ChEst range 304 over which the row's parameter values provide near optimal performance. As the minimum of each range equals the maximum of the previous range, it is sufficient for the table to include only one of these two columns to delineate the ranges 304.

The fourth column is the attenuation (ATN) parameter that may be used by the VGA 208. The fifth column is the inductor enable (EI) parameter that may be used by the CTLE 210 to control high frequency boost. The sixth column is the input common voltage control (ICS) parameter that may be used by the CTLE 210. The seventh column is the peaking capacitor control (CCS) parameter that may be used by the CTLE 210 to fine tune high frequency boost. The eighth column is the output buffer current control (ICO) parameter that may be used by the CTLE 210 to control gain. The ninth column is the reference voltage control (RFC) parameter that may be used by the ADC 212 for dynamic range control. The tenth column is the filter coefficient $c_{-1}$ (CM1) parameter that may be applied by the FIR filter as the tap coefficient for the digitized receive signal sample trailing after a current signal sample. The eleventh column is the filter coefficient $c_{+1}$ (CP1) parameter that may be used by the FIR filter as the tap coefficient for the signal sample preceding the current signal sample. The twelfth column is the filter coefficient $f_0$ (F0) parameter that may be used by the feedback filter or precomputation unit as a scale factor for a current symbol value. The last column is the filter coefficient $f_1$ (F1) parameter that may be used by the feedback filter or precomputation unit as a scale factor for determining expected intersymbol interference from a preceding symbol value.

Figure 4:
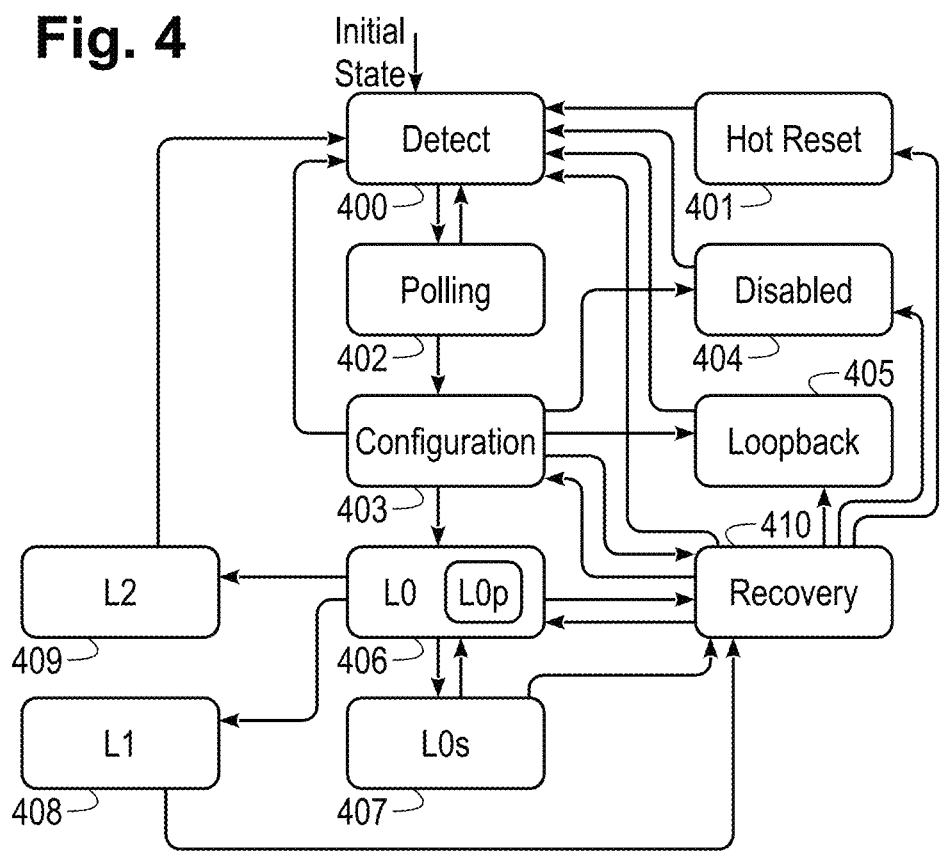
FIG. 4 is a state transition diagram of an illustrative link training state machine.

FIG. 4 is a state transition diagram of an illustrative link training state machine, which may be implemented for each of a given bus interface's receivers by a microcontroller 240. The illustrated state machine corresponds to the link training and status state machine (LTSSM) shown and described in Section 4.2 of the PCI Express Base Specification Revision 6.1. The referenced specification is hereby incorporated herein by reference in its entirety.

State 400 is the state in which the bus interface initially starts and may return to in the event of a reset or link failure. State 400 represents a detection state used by the bus interface to detect when the link lanes are each terminated at the far end, i.e., each connected to port that can send signals to at least one lane of the receiving port. Lack of such terminations may be apparent as a high impedance on the output signal conductors.

State 401 is a Hot Reset state which the bus interface enters if triggered to do so by the microcontroller 240 or if the bus interface determines a hot reset command has been received. After a 2 ms timeout, the bus interface enters the Detect state 400.

State 402 is a Polling state which the bus interface enters from state 400 after determining which lanes are terminated. In the Polling state, the bus interface transmits training ordered sets and responds to the training ordered sets it receives. The receivers achieve lock (clock synchronization) with the symbols and blocks conveyed by the receive signals, adjusting lane polarity and configuring equalizer settings as described herein. The interfaces exchange capability information to negotiate a data rate. If enough training ordered sets are exchanged before time out, the bus interface transitions to state 403. Otherwise, it returns to state 400.

State 403 is a configuration state that implements a negotiation sequence to determine the lane width of the link and the numbering of the lanes. If a link is disabled by the controller or by command OS, the bus interface transitions to state 404. If the controller or an ordered set command places the link into loopback mode, the bus interface transitions to state 405. If the negotiation sequence completes before time out, the bus interface transitions to state 406. Otherwise, the bus interface transitions to state 410.

State 404 is a Disabled state during which the bus interface maintains the link in an Electrical Idle mode. The bus interface transitions from this state to state 400 when an electrical idle exit command is detected.

State 405 is a loopback test mode which the controller may use to perform link testing. During the loopback test mode, the bus interface that initiates the loopback request is the lead, transmitting symbol patterns that will be echoed back by the remote end. When the bus interface exits this state, it returns to detect state 400.

State 406 is known as the L0 state which represents the state of normal operation for the link to transmit and receive data and control packets. The bus interface may exit the L0 state when an event occurs, or when a command OS is detected. The L0 state may have a substate L0p in which some lanes of the link are placed into idle mode while the rest remain active. The L0p is intended as a first power savings state. The bus interface transitions from the L0 state to the Recovery state 410 when a transition is encountered, e.g., a request to use a different data rate or to switch to a low-latency mode.

State 407 is a power savings state L0s entered from state 406 when the bus interface detects an Electrical Idle ordered set. The lanes are maintained in the electrical idle condition until an electrical idle exit command is detected. The bus interface exchanges a fast-training sequence across the link to re-establish synchronization before returning to block 406. If the fast-training sequence does not complete successfully, the bus interface transitions to recovery state 410.

State 408 is a power savings state L1 that offers greater power savings at the cost of additional resume latency. It may be selected by the controller or by a command ordered set as an alternative to the L0s state. Upon exiting this state, the bus interface transitions to recovery state 410.

State 409 is a power savings state L2 in which most of the interface is powered down to aggressively conserve power. When power is restored or a wakeup event is otherwise detected, the bus interface transitions to detect state 400.

In recovery state 410, the bus interface confirms or re-establishes symbol stream synchronization and may optionally update equalization settings and may renegotiate the data rate before optionally returning to state 406. The bus interface can also reach other states from here if prompted by the controller or a command OS. For example, the microcontroller 240 may initiate a transition to the loopback state 405, to the hot reset state 401, or to the disabled state 404.

Figure 6:
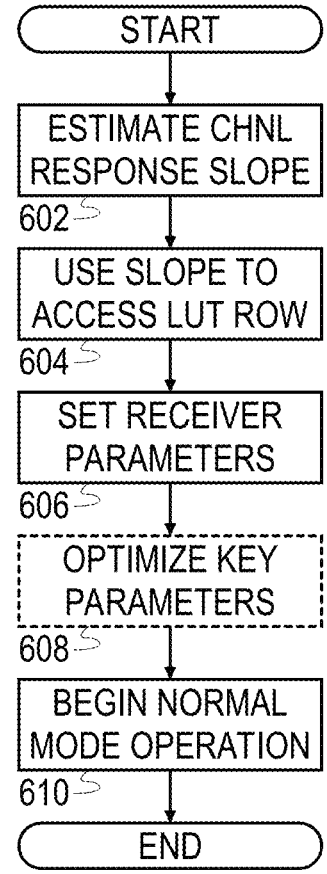
FIG. 6 is a flow diagram of an illustrative method for expedited receiver training.

Before summarizing the steps of the expedited training method in connection with FIG. 6, we describe the process for creating a method-enabling look-up table.

Figure 5:
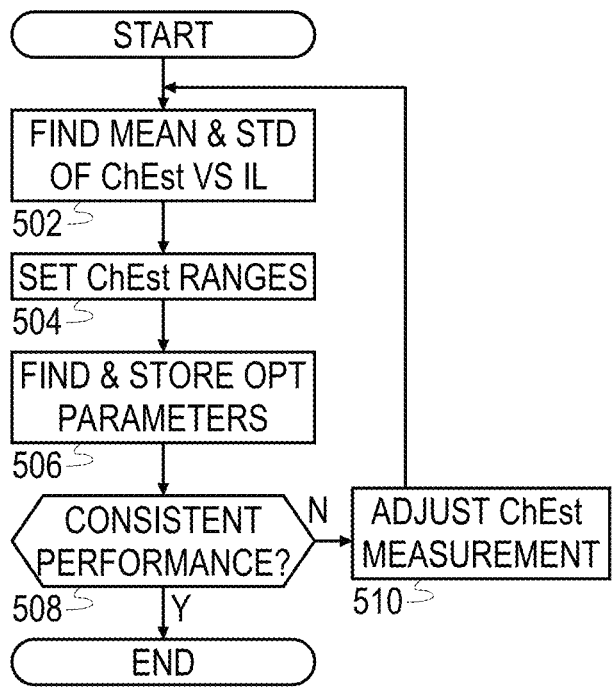
FIG. 5 is a flow diagram of an illustrative method for constructing a parameter lookup table.

The table creation method shown in FIG. 5 begins in block 502 with a determination of the relationship between insertion loss and channel estimation (ChEst) measurement. A computer models the operations of blocks 202-214 (FIG. 2) with default parameter values on a PCIe training ordered set for the Polling state 402 (FIG. 4) to determine the digitized receive signal streams for channels with different degrees of insertion loss. The computer performs ChEst measurements on the digitized receive signal streams, determining the measurement mean and standard deviation for each value of insertion loss.

In block 504, the computer uses the ChEst to insertion loss relationship to determines a set of ChEst measurement ranges, sizing the ranges so that the ChEst measurement will indicate the proper range (or, if near a boundary, an adjacent range) with high confidence. In block 506, the computer determines optimized parameter values for each range. The optimized parameter values may correspond to channel conditions near the center of each range. These optimized values may be stored in a look-up table such as that described previously.

In block 508, the computer evaluates the receiver performance for each set of optimized values not only over their associated range but also over the immediately adjacent ranges. The receiver performance may be determined using any suitable performance measurement including bit error rate, eye opening, and signal-to-noise ratio. If the performance for each of the look-up table rows is satisfactory, the process completes. Otherwise, the computer may adjust the ChEst measurement in block 510 to reduce the standard deviation, e.g., by averaging a larger number of ChEst measurements. A reduced standard deviation will produce a greater number of smaller ranges, thereby reducing the range over which each set of optimized parameters may be expected to operate. The table of FIG. 3 was achieved subtracting the mean of 128 high frequency PSD measurements (Nyquist*3/4) from the mean of 128 low frequency PSD measurements (Nyquist/4). From block 510, the process returns to block 502.

With the look-up table stored in nonvolatile memory, the microcontroller 240 may implement the expedited training method of FIG. 6. Beginning in block 602, the microcontroller 240 determines the slope of the channel response spectrum using the ChEst module 242. Though the slope can be calculated from the ChEst measurement, it may be sufficient to use the ChEst measurement itself in place of the slope. In block 604, the microcontroller 240 uses the ChEst measurement to determine the appropriate row of the look-up table, i.e., the row for which the measurement falls within the associated ChEst range. In block 606, the microcontroller retrieves the optimized parameter values from the selected row of the look-up table and sets the receiver's operating parameters accordingly. In optional block 608, the microcontroller determines receiver performance and further optimizes one or more of the operating parameters. To minimize training time, this optional optimization step may be limited to just a few parameters that have been determined to most affect receiver performance. The microcontroller 240 then exits the Polling state 402, completing higher level configuration of lanes in Configuration state 403 before entering normal operating mode (L0 State 406).

Bus interface device designers may rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("intellectual property (IP) core", "soft macro") but are frequently employed interchangeably.

The modular units can be expressed in different ways, e.g., in the form of a hardware description language (HDL) file, or as a fully routed design that could be directly printed to create a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description. In any case, such semiconductor IP cores may be kept in a design database which resides on a nontransient information storage medium, e.g., a hard disk, flash drive, or any of the known hardware implementations for cloud-based abstractions of nonvolatile information storage. Once the device has been fully designed, commercially available software may convert the semiconductor intellectual property cores and other integrated circuit components into semiconductor mask patterns also stored on a nontransient information storage medium. Thereafter, the patterns may be conveyed to the various process units in a suitable assembly line of an integrated circuit manufactory.

Numerous alternative forms, equivalents, and modifications will become apparent to those skilled in the art once the above disclosure is fully appreciated. The order of modules and operations described in the upstream and downstream paths can be varied, with certain operations being reordered, pipelined and/or performed in parallel. It is intended that the claims be interpreted to embrace all such alternative forms, equivalents, and modifications where applicable.

What is claimed is:

1. A receiver that comprises:
   a continuous time linear equalizer configured to provide a controllable amount of high frequency boost to an analog receive signal;
   an analog to digital converter configured to convert the analog receive signal into a digitized receive signal;
   a channel estimation module configured to obtain a spectral density measurement of the digitized receive signal at each of two different frequencies, the spectral density measurements having a difference indicating a slope of a channel response; and
   a microcontroller configured to set at least one operating parameter of the continuous time linear equalizer based on said difference.

2. The receiver of claim 1, further comprising: a digital filter configured to reduce intersymbol interference of the digitized receive signal, wherein the microcontroller is configured to set at least one coefficient of the digital filter based on said difference.

3. The receiver of claim 2, further comprising: a decision feedback equalizer having a feedback filter or a precomputation unit configured to compensate for trailing intersymbol interference of the digitized receive signal, wherein the microcontroller is configured to set at least one operating parameter of the feedback filter or precomputation unit based on said difference.

4. The receiver of claim 3, wherein the microcontroller is configured to set at least eight operating parameters based on said difference.

5. The receiver of claim 1, further comprising: a variable gain amplifier configured to adjust an amplitude of the analog receive signal, wherein the microcontroller is configured to set a gain of the variable gain amplifier based on said difference.

6. The receiver of claim 1, wherein the microcontroller is configured to set a reference voltage of the analog to digital converter based on said difference.

7. The receiver of claim 1, further comprising: a level finder configured to produce a receiver performance measure, wherein the microcontroller is configured to use the receiver performance measure to optimize at least one operating parameter after setting that at least one operating parameter based on said difference.

8. A method, the method comprising:
   using a continuous time linear equalizer to provide a controllable amount of high frequency boost to an analog receive signal;
   using an analog to digital converter to convert the analog receive signal into a digitized receive signal;
   obtaining a spectral density measurement of the digitized receive signal at each of two different frequencies, the spectral density measurements having a difference indicative of a slope of a channel response; and
   setting at least one operating parameter of the continuous time linear equalizer based on said difference.

9. The method of claim 8, further comprising: applying a digital filter to the digitized receive signal after setting at least one coefficient of the digital filter based on said difference.

10. The method of claim 9, further comprising: employing a decision feedback equalizer to recover symbols from the digitized receive signal after setting at least one operating parameter of the decision feedback equalizer based on said difference.

11. The method of claim 10, further comprising: using said difference to retrieve a set of optimized operating parameters from a look-up table, the set of optimized operating parameters enabling a receiver to enter normal operating mode without further training.

12. The method of claim 8, further comprising: applying a variable gain amplifier to the analog receive signal after setting a gain of the variable gain amplifier based on said difference.

13. The method of claim 8, further comprising: setting a reference voltage of the analog to digital converter based on said difference.

14. The method of claim 8, further comprising: measuring receiver performance based on at least one of equalization error, eye opening, and signal to noise ratio; and using the receiver performance to optimize at least one operating parameter after setting that at least one operating parameter based on said difference.

15. A method comprising:
   estimating a slope of frequency dependence of a channel response by:
      measuring a spectral density of a receive signal at two different frequencies; and
      determining a difference between the spectral densities at the two different frequencies;
   using the slope to retrieve a set of equalization parameters from a look-up table; and
   employing the set of equalization parameters to exit a receiver training mode.

16. The method of claim 15, wherein the set of equalization parameters includes:
   at least one operating parameter to adjust a high frequency boost of a continuous time linear equalizer;
   at least one coefficient of a digital filter for reducing leading intersymbol interference; and
   at least one coefficient of a decision feedback equalizer for recovering transmitted channel symbols.

17. The method of claim 16, wherein the set of equalization parameters includes:
   a gain for a variable gain amplifier; and
   a reference voltage for an analog to digital converter.

* * * * *